(12) United States Patent
Coles et al.

(10) Patent No.: US 9,396,083 B2
(45) Date of Patent: Jul. 19, 2016

(54) COMPUTER SYSTEM PROCESSES

(71) Applicant: International Business Machines Corporation, Armonk, NY (US)

(72) Inventors: David R. Coles, Hursley (GB); David J. Crighton, Hursley (GB); Alasdair J. Paton, Hursley (GB); Stuart J. Reece, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 14/508,031

(22) Filed: Oct. 7, 2014

(65) Prior Publication Data

US 2015/0169389 A1 Jun. 18, 2015

(30) Foreign Application Priority Data

Dec. 17, 2013 (GB) .................................. 1322317.7

(51) Int. Cl.
*G06F 9/54* (2006.01)
*G06F 11/30* (2006.01)
*G06F 11/34* (2006.01)

(52) U.S. Cl.
CPC .......... *G06F 11/302* (2013.01); *G06F 11/3452* (2013.01); *G06F 11/3409* (2013.01); *G06F 2201/865* (2013.01)

(58) Field of Classification Search
CPC .............. G06F 11/302; G06F 11/3452; G06F 11/3409; G06F 2201/865
See application file for complete search history.

(56) References Cited

U.S. PATENT DOCUMENTS

| 7,526,767 | B1 | 4/2009 | Rhee et al. |
|---|---|---|---|
| 8,141,096 | B1 | 3/2012 | Tormasov et al. |
| 8,375,394 | B2 | 2/2013 | Karthikesan |
| 2005/0167486 | A1* | 8/2005 | Horikawa et al. ............. 235/380 |
| 2006/0156309 | A1 | 7/2006 | Rhine et al. |
| 2008/0052719 | A1 | 2/2008 | Briscoe et al. |
| 2009/0049429 | A1 | 2/2009 | Greifeneder et al. |
| 2009/0217099 | A1 | 8/2009 | Kato |
| 2010/0257185 | A1 | 10/2010 | Dvir et al. |
| 2012/0272249 | A1 | 10/2012 | Beaty et al. |

FOREIGN PATENT DOCUMENTS

JP 2013061912 A 4/2013

OTHER PUBLICATIONS

Search Report under Section 17(5) dated May 29, 2014, International Application GB1322317.7, 3 pages.

(Continued)

*Primary Examiner* — Syed Roni
(74) *Attorney, Agent, or Firm* — Francis Lammes; Stephen J. Walder, Jr.; Diana R. Gerhardt

(57) ABSTRACT

A mechanism is provided for identifying an inter-relationship between a first process and the second process of a computer system. A correlation is detected between the first process and the second process based on a timing of the first process and the second process accessing a system resource of the computer system. An inter-relationship is then identified between the first process and the second process based on the detected correlation between the first process and the second process.

17 Claims, 8 Drawing Sheets

(56) References Cited

OTHER PUBLICATIONS

"Network Mapping", ManageEngine, http://www.manageengine.com/network-monitoring/network-mapping.html?gclid=CP226fa3k7gCFUNf, publication date unknown, Sep. 11, 2014, 4 pages.

"Tivoli Monitoring", IBM Corporation, http://www-03.ibm.com/software/products/en/tivomoni/, publication date unknown, Aug. 14, 2014, 2 pages.

"Tivoli Monitoring and Tivoli Composite Application Manager family", IBM Corporation, http://www-03.ibm.com/software/products/en/tivoli-monitoring-composite-app-mgmt., publication date unknown, Aug. 14, 2014, 2 pages.

Dean, Alexander, "Runtime Scheduling in Functional Languages", Rochester Institute of Technology, Aug. 8 2013, 15 pages.

Ho, Justin C. et al., "Scalable Group-based Checkpoint/Restart for Large-Scale Message-passing Systems", IEEE International Symposium on Parallel and Distributed Processing (IPDPS 2008), http://i.cs.hku.hk/~clwang/papers/ipdps2008-GroupCKP.pdf, Miami, FL, Apr. 14-18, 2008, 12 pages.

Russinovich, Mark, "Process Explorer v16.03", http://technet.microsoft.com/en-us/sysinternals/bb896653, Aug. 5, 2014, 2 pages.

* cited by examiner

COMPUTER SYSTEM PROCESSES

BACKGROUND

The invention relates to the field of computer systems. More particularly, the invention relates to the inter-relationship of processes of a computer system.

Due to the complexity of modern computer systems, it may be necessary to predict, measure, and/or monitor the health of a computer system. Performance metrics are therefore typically used to measure the health of computer systems. These performance metrics can include measurements of such as CPU usage/availability, memory usage, free space or response time. The performance metrics may be collected from a large number of devices within a computer system and then used to measure the overall health of the system.

Performance metrics relating to the operation of database systems and application servers, physical hardware network performance, etc., may all need to be monitored across networks that may include many computers (each executing numerous processes) so that problems can be detected (preferably before they arise).

It will therefore be appreciated that a computer system may have a seemingly endless range of performance metrics, and the performance metrics are not necessarily measured in a common scale or range.

Due to the complexity and potential number of performance metrics involved, it can be useful to only focus attention on a particular performance metric, so that an operator or the system does not become overwhelmed. However, it will be appreciated that a performance metric provides an indication of a value resulting from the (potentially large) number of processes being executed in the computer system. It does not provide an indication of which processes are contributing to the resultant value and by how much, for example. In other words, from monitoring a performance metrics, it may not be clear which processes interact to provide a single service or application that may have an impact on the value of the performance metric. Each application may execute many processes in a computer system, and it may not be clear which of them interact with each other without detailed knowledge of the application code for example.

Existing system monitoring products can use invasive monitoring to track transactions across multiple applications. However, use of such known monitoring products requires user application code to be instrumented to identify data which can be used to track transactions.

SUMMARY

In one illustrative embodiment, a method is provided for identifying an inter-relationship between a first process and the second process of a computer system. The illustrative embodiment detects a correlation between the first process and the second process based on a timing of the first process and the second process accessing a system resource of the computer system. The illustrative embodiment identifies the inter-relationship between the first process and the second process based on the detected correlation between the first process and the second process.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system or apparatus is provided. The system or apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

Embodiments of the invention will now be described, by way of example only, with reference to the accompanying drawings in which.

DETAILED DESCRIPTION

Figure 1:
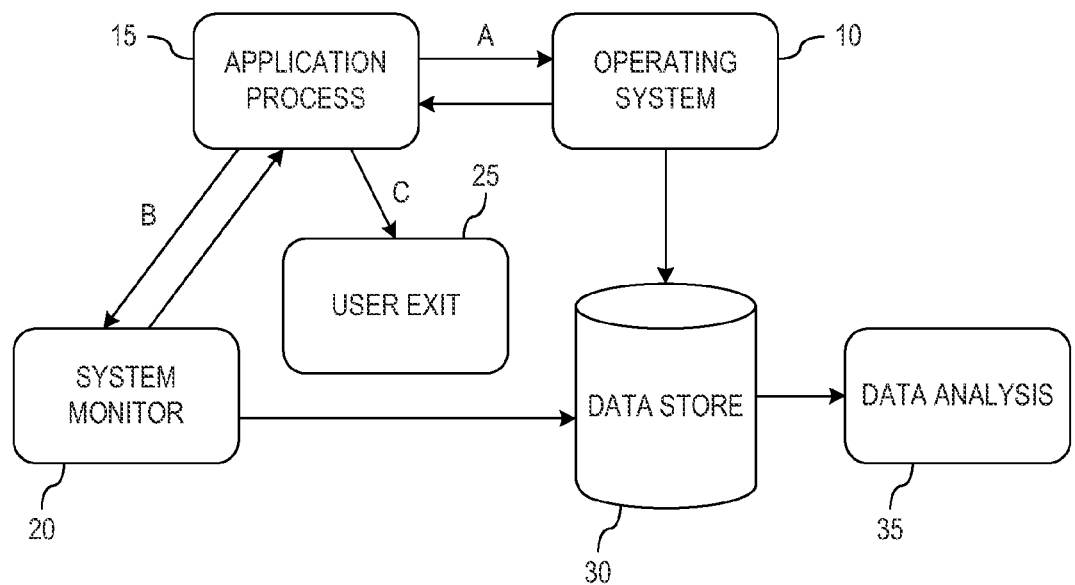
FIG. 1 is a schematic block diagram of a computer system according to an embodiment of the subject-matter.

It is proposed to identify dependencies or relationships between different processes running on one or more computer systems based on the timing of interactions with one or more common resources of the computer system(s), which may be provided by the operating system (OS). This may be performed automatically by analysing outputs of an OS level reporting facility, for example, to identify when system resources are used by different processes within a configurable time-frame. This may be used as a discovery method to map out enterprise infrastructure running on different machines of a computer system or for aggregating performance statistics or other operational monitoring data by workload.

System resources are what allocate and setup hardware components, helping hardware to work without causing issues with other hardware within your computer. A system resource is any usable part of a computer that can be controlled and assigned by the OS so all of the hardware and software on the computer can work together as designed. These resources might come from the CPU, the motherboard, system memory, etc.

Thus, a system resource may be considered as a tool used by either hardware to alert software of a need or by software to control a function of hardware. While there are many individual segments of a complete computer system that could be considered "system resources", there are generally four major system resource types:

Interrupt Requests (IRQ)—Hardware devices use the IRQ bus on a motherboard to signal the CPU for attention.

Direct Memory Access (DMA) Channels—Data travels back and forth between memory and a hardware device using this channel.

Input/Output (I/O) Port Addresses—Software addresses a hardware device using the device's port, or I/O, address. The device "listens" to the bus to determine if it is being requested.

Memory Addresses—Software communicates with physical memory located in either RAM or ROM chips using memory addresses.

The proposed concept may use facilities available to the OS so that applications do not need to be recompiled in order to add instrumentation to provide support for reporting.

Further, it may enable identification of structure and relationships between potentially unknown applications by traversing the resource usage links between applications. This may give a view of process and product relationships that might be otherwise unknown.

Relationships between processes that are discovered may be used to discover common resources which are used by related processes and may, for example, be used to identify performance bottlenecks between multiple products in a software stack.

Standard OS commands may be used to record process activity and store this data away, in a remote database for example, along with resource usage information such as process memory utilization and CPU time. Use of a remote database may help to minimise impact to the production applications being monitored as well as allowing a single "analysis server/unit" to process data for multiple machines in a network-based computer system.

The process activity data may include things like: file handles used by the processes; files accessed; host and port names connected to semaphores used; etc. Such process activity data may be collected using standard OS calls such as truss, strace, ipcs or lsof, for example. If required, this may be targeted at a specific resource or process of interest.

Analysis of the process activity may infer links between processes and report on combined resource usage or structure.

For example: lsof polling at a given time interval may record that, at a certain point in time, process A has a certain file open and, at a second time, process B has the same file open. The fact that both process A and B have accessed the same file may enable a relationship between processes A and B to be inferred as a result of the data analysis step. The resource usage of processes A and B, either in this time frame or overall, may then be combined to provide an overall resource usage for a composite workload of multiple components or processes of the same application/service.

Referring to FIG. 1, data on processes may be obtained in several ways. For example, FIG. 1 depicts a system according to an embodiment comprising an OS 10, an application process 15, a system monitor 20, a user exit application 25, a data store 30, and a data analysis unit 35. The data store 30 is adapted to store activity data provided to it by the OS 10, the system monitor 20, or the user exit application 25. The activity data representing activity of the application process 15 may be obtained and subsequently provided to the data store 30 in a number of different ways, including on or more of the following:

(A) by the OS tracking process activities and interactions and reporting these to the data store 30 as activity data;

(B) by the system monitor 20 regularly polling for various data, such as lsof and netstat and reporting the resultant information to the data store 30 as activity data; or (C) by the user exit application 25 reporting process activity to the data store 30 as activity data;

It will be appreciated that similar information about the activity of the application process 15 may be obtained across multiple systems using access to shared resources or via network connections. For example: polling netstat output on a first machine could be used to show that a process C opens a tcpip connection to port 2020 on a second machine. Similar output on the second machine may show that process D listens on port 2020 and receives a connection in the appropriate timeframe. It may then be inferred that these processes are linked in some way.

As some common system resources may be used by almost all processes, embodiments may be adapted to filter out some of these common resources, such as shared event logs like syslog. Other restrictions or filters could be applied, such as requiring activities such as file interactions to take place within a certain time of each other (in other words, within a predetermined window of time). Such filters or restrictions may be adaptable/tunable, perhaps on a per process basis, so as to refine inferred links and improve accuracy.

Information about identified inter-relationships between processes obtained by using the proposed concept(s) may be further combined with data from existing technologies which provide application data or process hierarchies provided by the OS. Furthermore, information could be combined across multiple systems using access to shared resources or via network connections.

Figure 2:
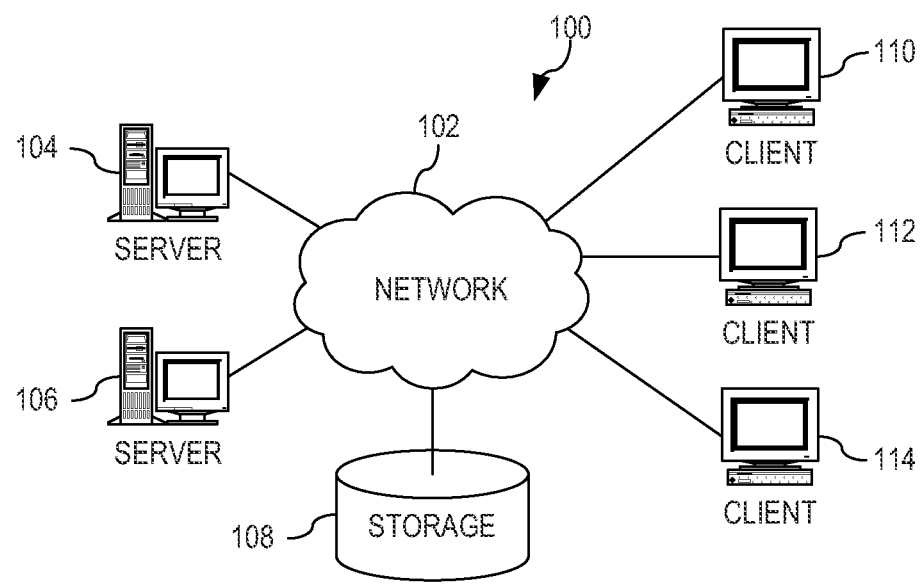
FIG. 2 depicts a pictorial representation of an example distributed data processing system in which aspects of the illustrative embodiments may be implemented.
Figure 3:
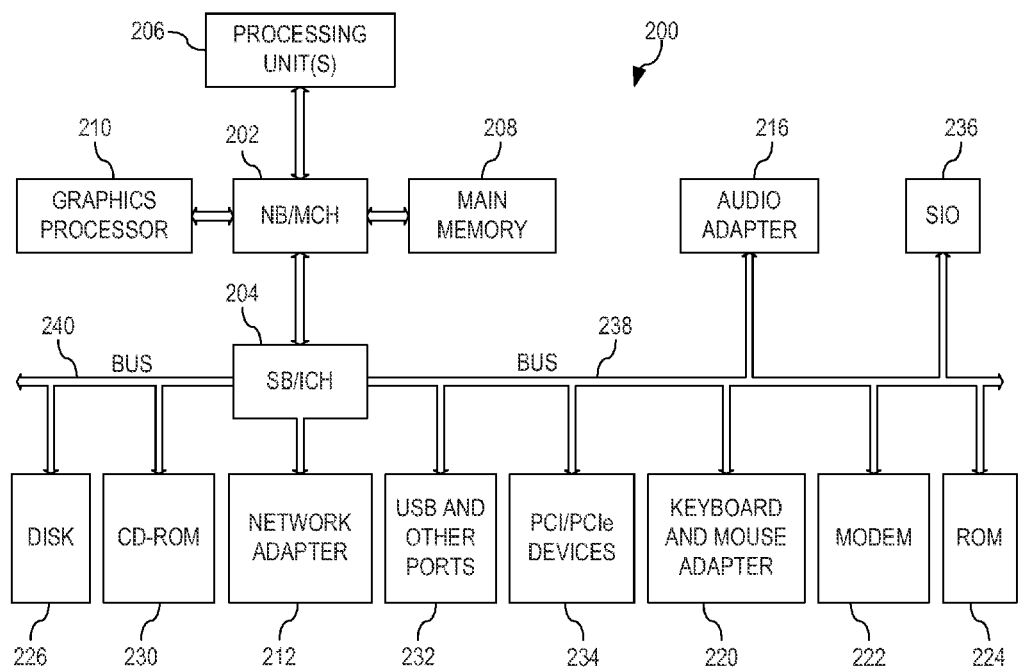
FIG. 3 is a block diagram of an example data processing system in which aspects of the illustrative embodiments may be implemented.

Illustrative embodiments may be utilized in many different types of data processing environments and/or computer systems. In order to provide a context for the description of elements and functionality of the illustrative embodiments, FIGS. 2 and 3 are provided hereafter as example environments in which aspects of the illustrative embodiments may be implemented. It should be appreciated that FIGS. 2 and 3 are only examples and are not intended to assert or imply any limitation with regard to the environments in which aspects or embodiments of the present invention may be implemented. Many modifications to the depicted environments may be made without departing from the spirit and scope of the present invention.

FIG. 2 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed data processing system 100 may include additional servers, clients, and other devices not shown.

In the depicted example, the distributed data processing system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 3 is a block diagram of an example data processing system 200 in which aspects of the illustrative embodiments may be implemented. The data processing system 200 is an example of a computer, such as client 110 in FIG. 1, in which computer usable code or instructions implementing the processes for illustrative embodiments of the present invention may be located.

In the depicted example, the data processing system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on the processing unit 206. The operating system coordinates and provides control of various components within the data processing system 200 in FIG. 2. As a client, the operating system may be a commercially available operating system. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. The data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as first bus 238 or second bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 2 and 3 may vary depending on the implementation. Other internal hardware or peripheral devices, such as flash memory, equivalent non-volatile memory, or optical disk drives and the like, may be used in addition to or in place of the hardware depicted in FIGS. 2 and 3. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, the data processing system 200 may be a portable computing device that is configured with flash memory to provide non-volatile memory for storing operating system files and/or user-generated data, for example. Thus, the data processing system 200 may essentially be any known or later-developed data processing system without architectural limitation.

To assist in identification of relationships between processes, there may be proposed a concept wherein process activity monitoring signals are converted into respective quantised signals having a greatly reduced set of allowable values (compared to the respective original process activity monitoring signals). The quantised signals could be as simple as a binary signal (indicating access or non-access to a predetermined system resource for example), or could be slightly more complex such as allowing four values which may indicate access or non-access to a plurality of different system resources. The quantised signals for the same or similar time periods can then be compared to identify when variations in the signals occur at the same time (or at close temporal proximity) which may indicate inter-relationship exists between the respective processes. A large number of quantised signals may be quickly compared, and simultaneous or closely occurring access to a system resource identified. Also, by dealing with discrete values, process activity that is not relevant may be easily ignored and processing requirements may be reduced.

Figure 4:
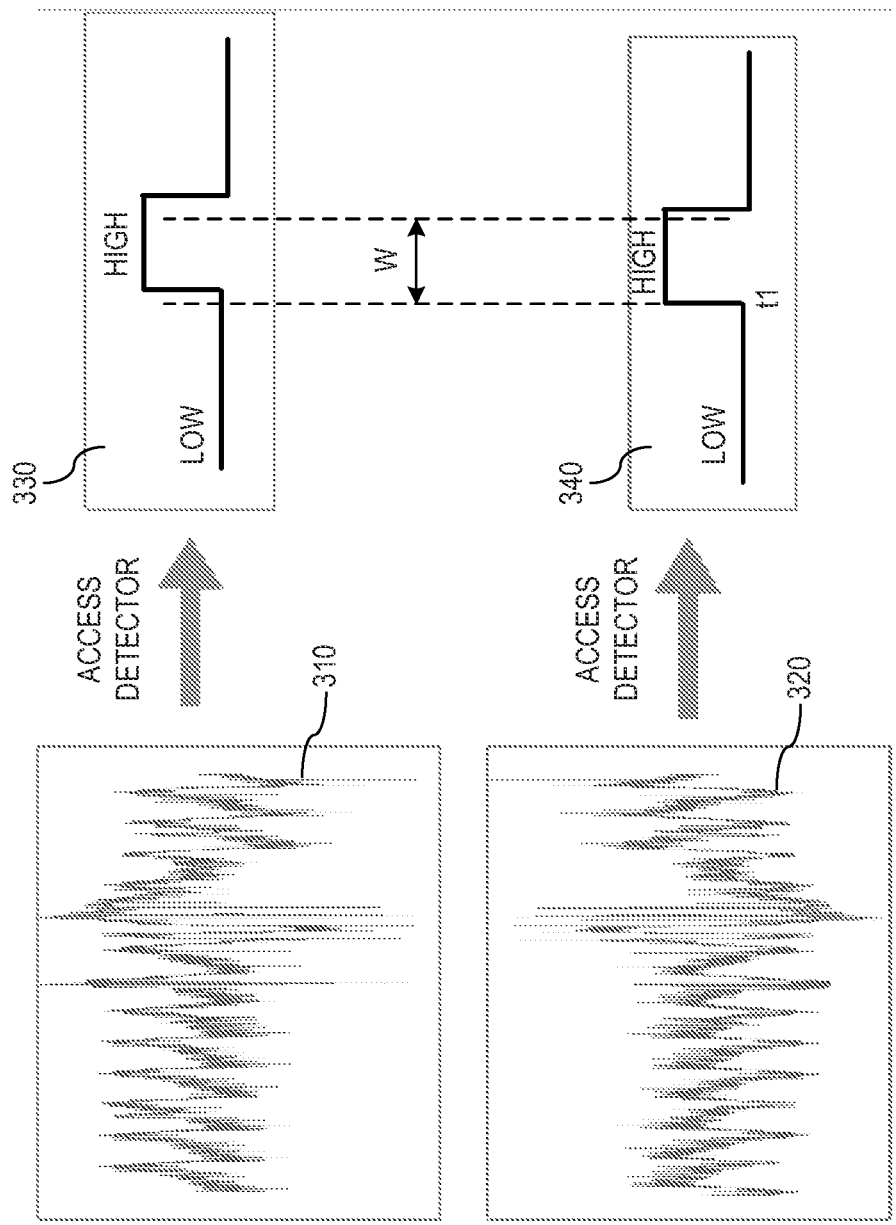
FIG. 4 illustrates a method of identifying an inter-relationship between performance metrics of a computer system according to an embodiment.

Referring to FIG. 4, there is illustrated an embodiment of the invention. Firstly, first 310 and second 320 process activity monitoring signals are obtained. The first process activity monitoring signal 310 is a signal representing activity of the first process over a predetermined time period T, and the second process activity monitoring signal 320 represents a variation of the second process over the same time period T. It will therefore be appreciated that the first and second process activity monitoring signals may be the signals obtained from first and second detectors, respectively. These signals may therefore be continuous analogue signals (having an infinite range of possible values) or they may be digital signals having a range of possible values dictated by the accuracy/resolution of the detector. Here, in this example, the first 310 and second 320 process activity monitoring signals represent the memory addresses accessed by the first and second processes over time.

The first 310 and second 320 process activity monitoring signals are converted into quantised signals which may more clearly identify the occurrence of access to a predetermined memory address in process activity.

The first process activity monitoring signal 310 is converted into a first quantised signal 330 having two allowable discrete values. The two allowable values are used to represent either the access or non-access to a predetermined memory address in the first process activity monitoring signal 310. The first allowable value is a 'logical low', which indicates the non-access to the predetermined memory address, and the second allowable value is a 'logical high', which indicates the occurrence of access to the predetermined memory address. Converting the first process activity monitoring signal 310 into the first quantised signal 330 may, for example, comprise quantising the first process activity monitoring signal 310 by approximating a value (such as magnitude, for example) of the first performance metric signal 310 at every time instant to one of two allowable values ('logical low' or 'logical high').

Approximating a value to one of the two values may comprise comparing the value with a predetermined value which indicates the access to the predetermined memory address, wherein if the value does not equal the predetermined value, non-occurrence of access is concluded and the value is approximated to the 'logical low' value. Conversely, if the value is equal to the predetermined value, occurrence of access is concluded and the value is approximated to the 'logical high' value. Accordingly, in this example, conversion of the first process activity monitoring signal 310 into a first quantised signal 330 may be seen as a system resource access/usage detection process which detects when the first process activity monitoring signal 310 is indicating the occurrence of predetermined system resource access/usage by the first process activity.

Similarly, the second process activity monitoring signal 320 is converted into a second quantised signal 340 having two allowable discrete values. The two allowable values are used to represent either the access or non-access to a predetermined memory address in the second process activity monitoring signal 320. The first allowable value is a 'logical low', which indicates the non-access to the predetermined memory address, and the second allowable value is a 'logical high', which indicates the occurrence of access to the predetermined memory address. Converting the second process activity monitoring signal 320 into the second quantised signal 340 may, for example, comprise quantising the second process activity monitoring signal 320 by approximating a value (such as magnitude, for example) of the second process activity monitoring signal 320 at every time instant to one of two allowable values ('logical low' or 'logical high').

Approximating a value to one of the two values may comprise comparing the value with a predetermined value which indicates the access to the predetermined memory address, wherein if the value does not equal the predetermined value, non-occurrence of access is concluded and the value is approximated to the 'logical low' value. Conversely, if the value is equal to the predetermined value, occurrence of access is concluded and the value is approximated to the 'logical high' value. Accordingly, in this example, conversion of the second process activity monitoring signal 320 into a second quantised signal 340 may be seen as an anomaly detection process which detects when the second performance metric signal 320 is indicating the occurrence of predetermined system resource access/usage by the second process.

The first 330 and second 340 quantised signals are then compared to detect a correlation between the first 330 and second 340 quantised signals. This comparison may be made by identifying the timing of variations in the first 330 and second quantised 340 signals and assessing their temporal proximity to each other.

Inter-relationship between the first and second processes may then be identified based on the detected correlation between the first and second quantised signals.

Such embodiments may therefore be used to determine which processes are associated with a particular system resource, for example, and this may provide information on the cause of system resource usage.

For example, a change from logical low to logical high in both the first 330 and second 340 quantised signals within a small predetermined time window W (following the point in time t1 that the first change is detected) may indicate that the second process is dependent on the first process. If the second process is an important/key process, this identification of dependency could indicate that occurrence of access to a predetermined memory address by the first process is a precursor to the occurrence of access to the predetermined memory address by the second process. Detecting the occurrence of an system resource usage by the first process may therefore be used as an advance warning signal ahead of system resource usage by the second (and important) process. Thus, a warning signal may be communicated and action undertaken so as to either allocate adequate system resources or reduce a resultant effect of the expected activity of the second process.

Considering further embodiments, a brief explanation of graph data structure will now be provided for an improved understanding.

Figure 5:
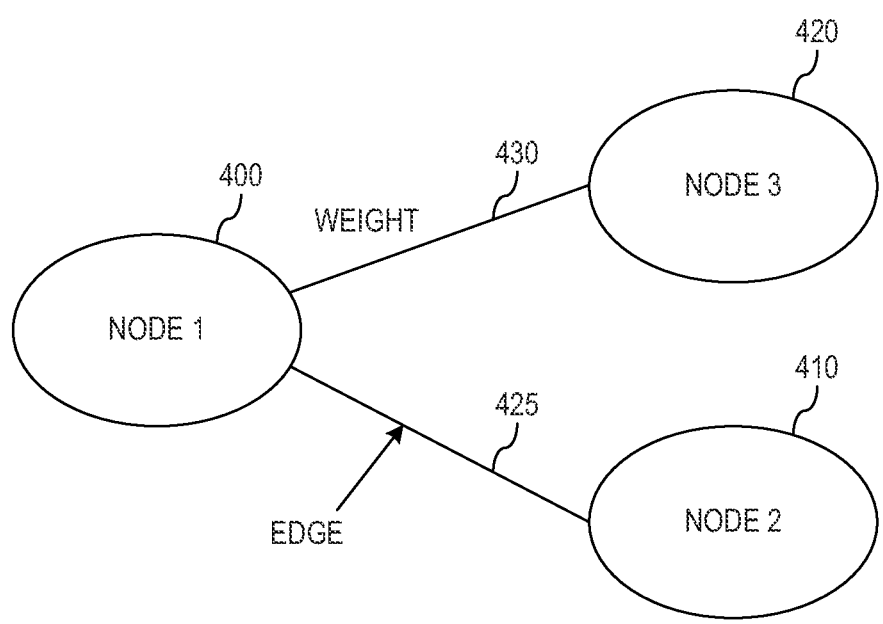
FIG. 5 shows an exemplary graph illustrating a relationship between three objects.

A data structure known as a graph is a useful way of describing relationships between objects. FIG. 5 shows an exemplary graph illustrating a relationship between three objects. The graph comprises first 400 to third 420 circles known as nodes. In the context of this disclosure, a node may be used to represent a process of a computer system. A first line 425, known as an edge, is connected between the first 400 and second 410 nodes and is used to describe the relationship between the first 400 and second 400 nodes. A second line 430, known as an edge, is connected between the first 400 and third 420 nodes and is used to describe the relationship between the first 400 and third 420 nodes.

These edges 425,430 can have a weight attached to them, and edges with higher weights are worth more (e.g. have a higher importance) than those with lower ones.

In the example of FIG. 5, the first 400 and second 410 nodes are referred to as neighbours because there is a direct edge 425 connecting then. Similarly, the first 400 and third 420 nodes are referred to as neighbours because there is a direct edge 430 connecting them. Because there is no direct edge connecting the second 410 and third 420 nodes, they are not neighbours.

As will be seen for the first node 400, there can be multiple edges attached to a single node.

Figure 6:
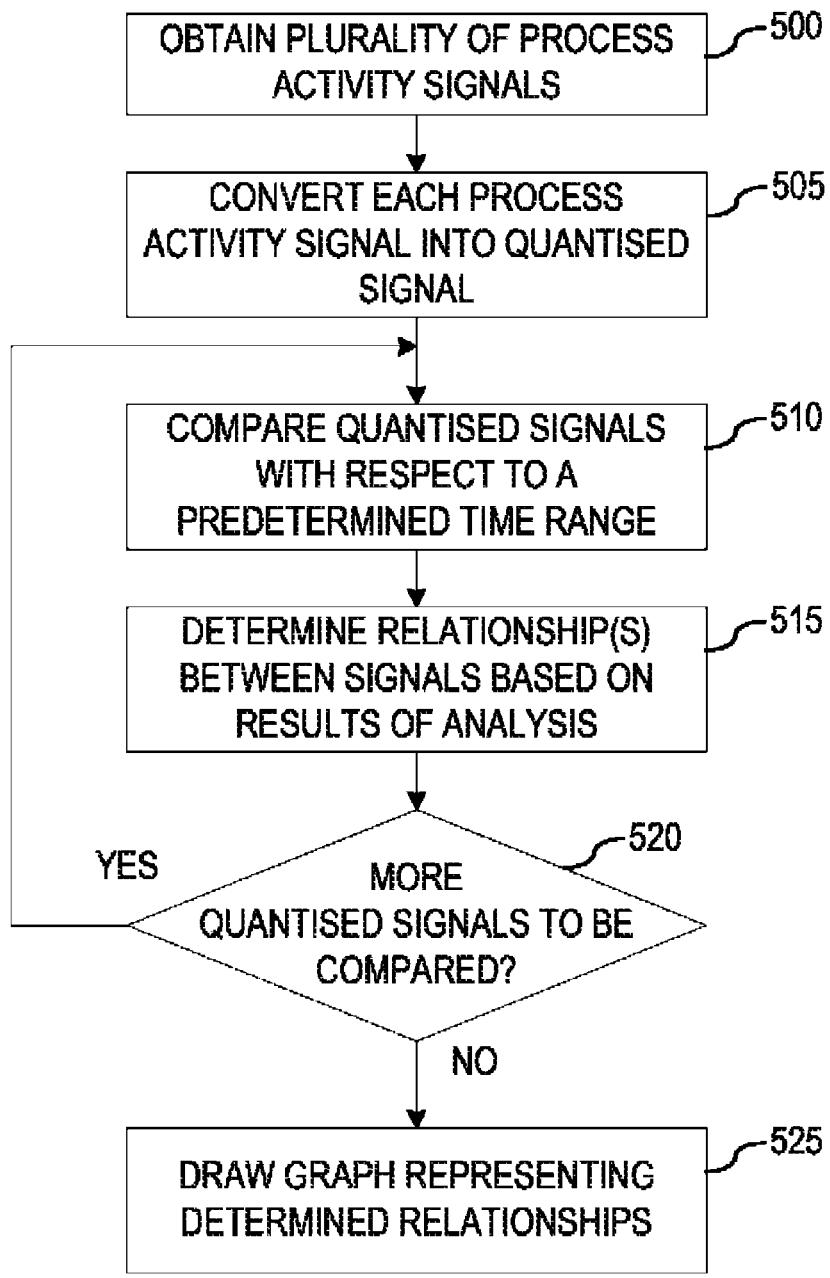
FIG. 6 is a flow diagram of a method according to an embodiment.

Referring now to FIG. 6, there is shown a flow diagram of an example implementation of a method according to an embodiment of the present subject matter. FIG. 6 shows the steps of the method carried out by a computer system, such as the system in FIG. 1, 2 or 3, according to one example of the present subject matter.

The method starts in step 500 wherein a plurality of process activity monitoring signals is obtained from a computer system. Each process activity monitoring signal represents activity of a process of the computer system over predetermined time period, say 24 hours for example. Purely by way of example, each signal may be obtained from a respective detection unit within the computer system, or from a central monitoring unit which is adapted to monitor numerous processes of the computer system.

Next, in step 505, each of the plurality of process activity monitoring signals is transformed into a binary signal, wherein the value a binary signal (at a time Tn) indicates whether or not a value of the respective performance metric signal indicates the access or non-access (at time Tn) to a predetermined system resource. Such transformation of a performance metric signals into a binary signal may be undertaken by a detection unit which analyses a signal and outputs a value of '1'/'Logical High' or '0'/'Logical Low' depending on whether access to a predetermined system resource is detected or not. For example, such a detection unit may be arranged to output a value of '1'/'Logical High' only if access to the predetermined system resource is detected, otherwise a value of '0'/'Logical Low' is output, resulting in a binary signal that indicates the occurrence of access to a predetermined system resource by having a value of '1'/'Logical High'.

Then, in step 510, binary signals are compared for a user-defined time window, wherein it is considered that access to the predetermined system resource occurring within that time are overlapping or occur simultaneously. For example, for signals obtained over a 24 hour period, a one hour time window length may be used wherein it would be considered that access to the system resource occurring in the same one hour window occurred 'simultaneously'. Of course, other time window lengths may be used to detect simultaneously occurring access. By way of example, a time window length of less than one millisecond may be employed to detect anomalies that occurred at the same time.

Based on the comparison results, the relationship(s) between signals is/are determined in step 515. For example, where it is identified that first and second binary signals changed from a value of '0'/'Logical Low' to a value of '1'/'Logical High' within a predetermined time window, it may be determined that the first and second binary signals are related and it may be further determined which signal is dependent on which by analysing which signal was the first to change from a value of '0'/'Logical Low' to a value of '1'/'Logical High'.

After determining the relationship(s) between the signals compared in step 515, the method continues to step 520 wherein it is checked if more quantised signals are to be compared. If in step 520 it is determined that more quantised signals are to be compared, the method returns to step 510 and the process of comparison (step 510) and relationship determination (515) is undertaken once again. If in step 520 it is determined that no more quantised signals are to be compared, the method continues to step 525 when a graphic representation of the determined relationships is created.

Step 525 of creating a graphic representation of the determined relationships may, for example, comprise the creation of graph similar to that of FIG. 5 for example. An exemplary algorithm for creating such as graph may be as follows:

Obtain a list of the processes that have simultaneously accessed a predetermined system resource (e.g. those accessing the system resource within a predetermined time window);

Create nodes representing all the processes of the list (for those that do not have nodes already);

For each process of the list, do as follows:
(a) Insert a new edge in the graph from the current process node to all the other processes currently/simultaneously accessing the system resource;
(b) If the edge above in (a) exists already, increase the weight of that edge by 1; and
(c) Increase a counter that represents the number of times the process has accessed the system resource.
(d) If no previous access has occurred within this time window, increase the total access counter by one.

Figure 7:
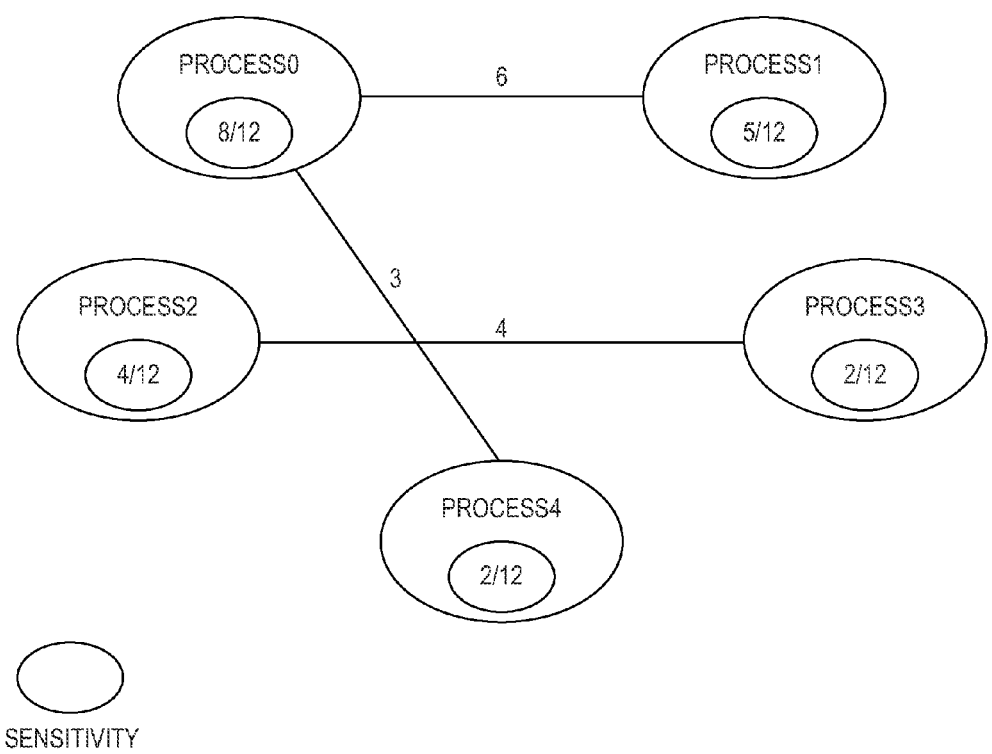
FIG. 7 a graph representing the inter-relationships between processes of a computer system as determined according to an embodiment of the invention.

Running the above algorithm may provide a graph representing the inter-relationships between performance metrics as shown in FIG. 7.

The structure of such a graphical representation may make a number of properties of performance metrics apparent. For example:

The number of edges attached to a node indicates the number of dependant processes (in either direction);

Each edge represents access to the predetermined system resource that occurred in the processes it connects and within a predetermined time window. For example, from FIG. 7 it can be derived that PROCESS0 and PROCESS1 simultaneously accessed the predetermined system resource, but PROCESS4 and PROCESS1 never did. This may indicate that PROCESS4 and PROCESS1 do not share a dependency. If, however, at a later point PROCESS4 and PROCESS1 do have an overlap, the weight of the edge would be low compared to the other edges in the graph, indicating a weak link between the two.

The total number of times a process has accessed the predetermined system resource may indicate its importance or dominance. In the example of FIG. 7, if access to the predetermined system resource was to happen in general, it may have an 8/12 chance of involving PROCESS0.

The weight of a specific edge over the sum of weights attached to a node may indicate the likelihood of access affecting the neighbour attached to the edge. As an example, the edge weight between PROCESS0 and PROCESS1 has a weight of 6. From historic data, if PROCESS1 is accesses the predetermined system resource there may be a 5/5 chance that PROCESS0 will also access the predetermined system resource. The reverse may not be true—if PROCESS0 is accesses the predetermined system resource, there may be a 5/8 chance that PROCESS1 will access the predetermined system resource. This indicates that PROCESS0 is dependent on PROCESS1 but not vice-versa.

The recording of access occurrence times may also aid identifying and mapping dependencies. For example, if PROCESS1 constantly accesses the predetermined system resource before PROCESS0, it may indicate that PROCESS0 has a dependency on PROCESS1, and, in such a situation, the detection of access to the predetermined system resource by PROCESS1 may be used to provide an advance warning of access to the predetermined system resource by PROCESS0.

The generated graphic representation may be presented to a user, allowing him/her to find high usage areas, and dependencies between processes. Access alarms can also be merged together if a group of processes have consistently accessed the predetermined system resource in the past.

Information about identified relationships could be provided to a system administrator for review or analysis. The system administrator may decide to stop monitoring process that are seen to be duplicates or effectively measured by alternative process in the system.

A number or monitored processes may therefore be reduced. Further, complexity and/or cost savings may be achieved by allowing for only the monitoring of process that are easier and/or cheaper to monitor but which may have inter-dependencies with other processes (that are more difficult and/or more expensive to monitor).

If enough support is found for a given relationship between processes, the relationship may be used for example to automatically suppress or group alarms/notifications on commonly related processes, or to increase the severity of an alarm/notification that is known to impact multiple processes.

Contextual information may also be added to an alarm or warning signal generated in respect of a given process. By way of example, a warning signal may comprise information as follows: "PROCESS1 is currently executing and is commonly used at the same or similar time(s) as PROCESS0. It commonly happens as a precursor to PROCESS0 and generally happens after PROCESS2".

Figure 8:
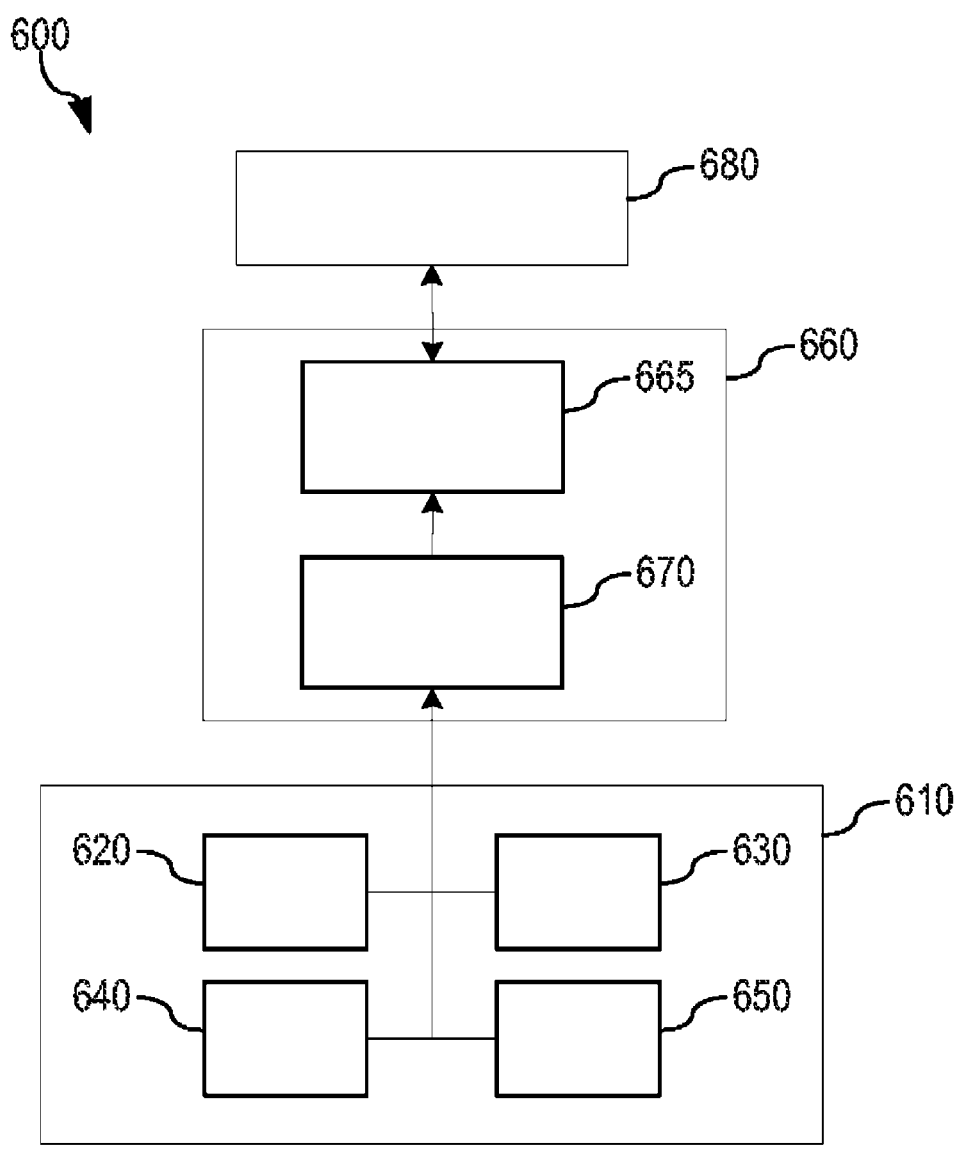
FIG. 8 is a schematic block diagram of a system according to an embodiment of the invention.

Referring now to FIG. 8, there is shown a schematic block diagram of system 600 according to an embodiment of the invention. The system 600 comprises a computer system 610 having first 620 to fourth 650 detectors adapted to generate first to fourth process activity monitoring signals, respectively. Each process activity monitoring signal represents the activity of a process of the computer system 610 over a predetermined time period. The system 600 also comprises a processing unit 660 having a quantising module 665 and a data analysis module 670.

The first to fourth process activity monitoring signals are provided from the first 620 to fourth 650 detectors to the quantising module 665 of the processing unit 660.

The quantising module 665 is adapted to transform the first to fourth process activity monitoring signals into first to fourth binary signals, respectively, wherein the value a binary signal (at a time Tn) indicates whether or not a value of the respective process activity monitoring signal indicates the access or non-access (at time Tn) to a predetermined system resource. Such transformation of a process activity monitoring signal into a binary signal may be undertaken by the quantising module 665 by analysing the process activity monitoring signal and outputting a value of '1'/'Logical High' or '0'/'Logical Low' depending on whether access to the predetermined system resource is detected or not. For example, the quantising module 665 may be arranged to output a value of '1'/'Logical High' only if access to the predetermined system resource is detected, otherwise a value of '0'/'Logical Low' is output, resulting in a binary signal that indicates the occurrence of access by having a value of '1'/ 'Logical High'.

The quantising module 665 provides the generated first to fourth binary signals to the data analysis module 670 of the processing unit 660. The data analysis module 670 compares the binary signals for a user-defined time window, wherein it is considered that multiple accesses to the predetermined system resource occurring within that time are overlapping or occur simultaneously. For example, for signals obtained over a one hour period, a one minute time window length may be used wherein it would be considered that access occurring in the same one minute window occurred 'simultaneously'. Of course, other time window lengths may be used to detect simultaneously occurring anomalies. By way of example, a time window length of less than one second may be employed to detect access to the predetermined system resource that occurred at the same time.

Based on the comparison results, the data analysis module 670 determines if any relationship(s) exist between signals. For example, where it is identified that first and second binary signals changed from a value of '0'/'Logical Low' to a value of '1'/'Logical High' within a predetermined time window, the data analysis module 670 may be determine that the first and second binary signals are related and it may be further determined which signal is dependent on which by analysing which signal was the first to change from a value of '0'/ 'Logical Low' to a value of '1'/'Logical High'.

After determining the relationship(s) between the signals, the data analysis module 660 provides an output signal to a user interface 680 which generates a graphic representation of the relationships indicated by the output signal.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

It will be clear to one of ordinary skill in the art that all or part of the method of one embodiment of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to one embodiment of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method of identifying an inter-relationship between a first process and a second process of a computer system, the method comprising:
   detecting a correlation between the first process and the second process based on a timing of the first process and the second process accessing a system resource of the computer system, wherein the detection of the correlation further comprises:
      obtaining a first metric signal for the first process, the first metric signal representing a variation of activity of the first process over time;
      obtaining a second metric signal for the second process, the second metric signal representing a variation of activity of the second process over time;
      converting the first metric signal into a first quantized signal having a first set of allowable discrete values;
      converting the second metric signal into a second quantized signal having a second set of allowable discrete values; and
      detecting a correlation between the first quantized signal and the second quantized signal based on a timing of variations in the first quantized signal and the second quantized signal; and
   identifying the inter-relationship between the first process and the second process based on the detected correlation between the first process and the second process.

2. The method of claim 1, wherein the system resource comprises at least one of: an Interrupt Request; a Direct Memory Access Channel; an Input/Output Port Address; or a Memory Address.

3. The method of claim 1, wherein the first metric signal and the second metric signal represent a variation of activity of the first process and the second process, respectively, over a common time period.

4. The method of claim 1, wherein the first set of allowable discrete values consists of first value and a second value and wherein converting the first metric signal into the first quantized signal comprises approximating the first value of the first metric signal at a time instant to the second value if the first value is representative of the first process accessing the system resource at the time instant.

5. The method of claim 1, further comprising:
   generating a graphical representation of the identified inter-relationship between the first process and the second process.

6. The method of claim 1, further comprising:
   determining a dependency between the first process and the second process based on the identified inter-relationship between the first process and the second process; and
   based on the determined dependency, using only one of the first process or the second process for assessing system resource usage.

7. A computer program product for identifying an inter-relationship between processes of a computer system, wherein the computer program product comprises a non-transitory computer-readable storage medium having computer readable program stored therein, wherein the computer readable program, when executed on a computing system, causes the computing system to:
   detect a correlation between a first process and a second process of the computing system based on a timing of the first process and the second process accessing a system resource of the computer system, wherein the computer readable program to detect the correlation further causes the computing system to:
      obtain a first metric signal for the first process, the first metric signal representing a variation of activity of the first process over time;
      obtain a second metric signal for the second process, the second metric signal representing a variation of activity of the second process over time;
      convert the first metric signal into a first quantized signal having a first set of allowable discrete values;
      convert the second metric signal into a second quantized signal having a second set of allowable discrete values; and
      detect a correlation between the first quantized signal and the second quantized signal based on a timing of variations in first quantized signal and the second quantized signal; and
   identifying an inter-relationship between the first process and the second process based on the detected correlation between the first process and the second process.

8. The computer program product of claim 7, wherein the first metric signal and the second metric signal represent a variation of activity of the first process and the second process, respectively, over a common time period.

9. The computer program product of claim 7, wherein the first set of allowable discrete values consists of first value and a second value and wherein the computer readable program to convert the first metric signal into the first quantized signal further causes the computing system to approximate the first value of the first metric signal at a time instant to the second value if the first value is representative of the first process accessing the system resource at the time instant.

10. The computer program product of claim 7, wherein the computer readable program further causes the computing system to:
    generate a graphical representation of the identified inter-relationship between the first process and the second process.

11. The computer program product of claim 7, wherein the computer readable program further causes the computing system to:
    determine a dependency between the first process and the second process based on the identified inter-relationship between the first process and the second process; and
    based on the determined dependency, use only one of the first process or the second process for assessing system resource usage.

12. A computer system comprising:
    a processor; and
    a memory coupled to the processor, wherein the memory comprises instructions which, when executed by the processor, cause the processor to:
    detect a correlation between a first process and a second process based on a timing of the first process and the second process accessing a system resource of the computer system, wherein the instructions to detect the correlation further cause the processor to:

obtain a first metric signal for the first process, the first metric signal representing a variation of activity of the first process over time;

obtain a second metric signal for the second process, the second metric signal representing a variation of activity of the second process over time;

convert the first metric signal into a first quantized signal having a first set of allowable discrete values;

convert the second metric signal into a second quantized signal having a second set of allowable discrete values; and detect a correlation between the first quantized signal and the second quantized signal based on a timing of variations in the first quantized signal and the second quantized signal; and identify an inter-relationship between the first process and the second process based on the detected correlation between the first process and the second process.

13. The computer system of claim 12, wherein the system resource comprises at least one of: an Interrupt Request; a Direct Memory Access Channel; an Input/Output Port Address; or a Memory Address.

14. The computer system of claim 12, wherein the first set of allowable discrete values consists of first value and a second value and wherein the instructions to convert the first metric signal into the first quantized signal further causes the processor to approximate the first value of the first metric signal at a time instant to the second value if the first value is representative of the first process accessing the system resource at the time instant.

15. The computer system of claim 12, wherein the instructions further cause the processor to:

generate a graphical representation of the identified inter-relationship between the first process and the second process.

16. The computer system of claim 12, wherein the instructions further cause the processor to:

determine a dependency between the first process and the second process based on the identified inter-relationship between the first process and the second process; and based on the determined dependency, use only one of the first process or the second process for assessing system resource usage.

17. The computer system of claim 12, wherein the first metric signal and the second metric signal represent a variation of activity of the first process and the second process, respectively, over a common time period.

* * * * *